Figure 1A:
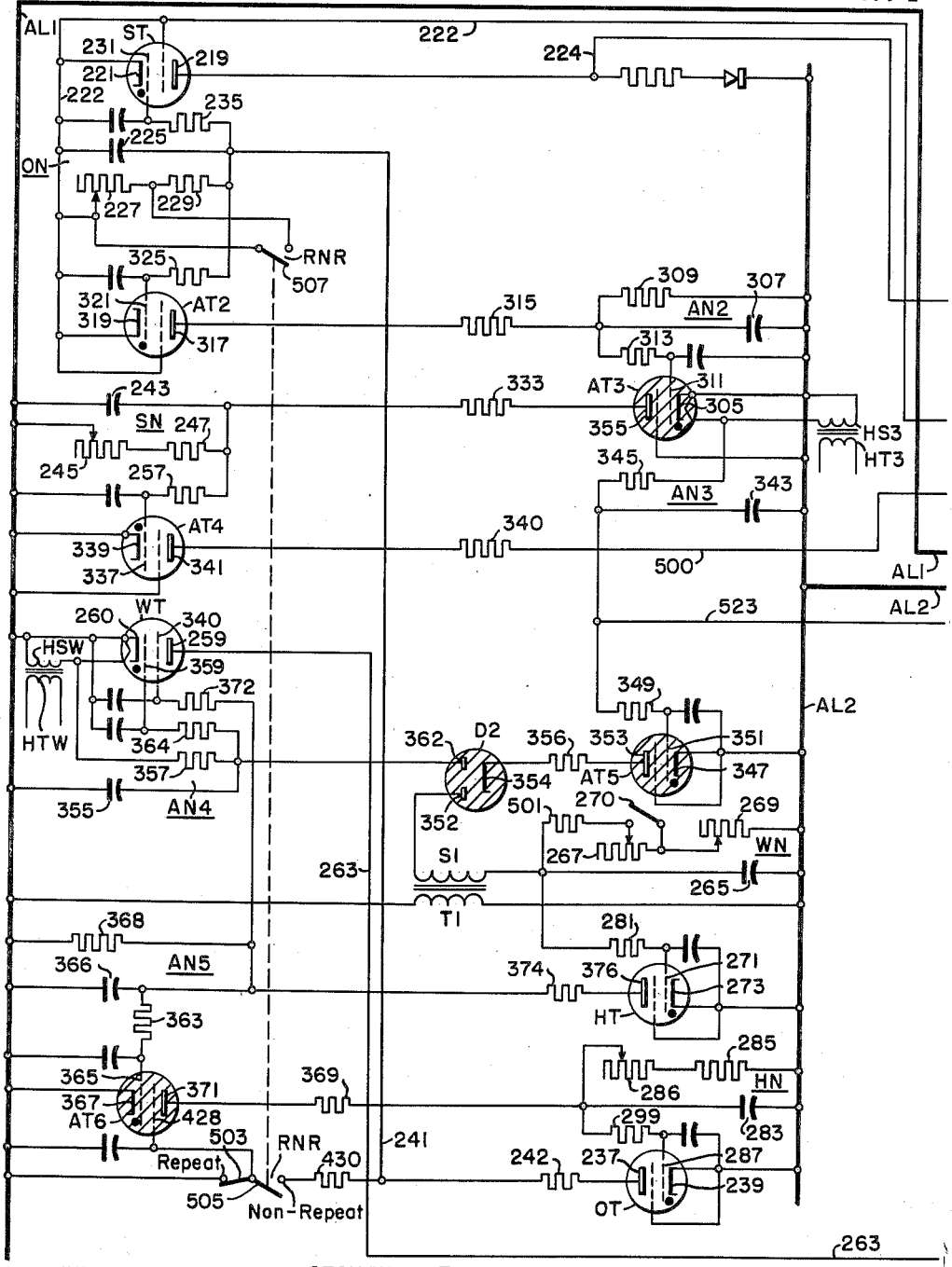

United States Patent Office 2,970,271
Patented Jan. 31, 1961

2,970,271

ELECTRIC DISCHARGE APPARATUS

Hubert W. Van Ness, Diablo, and Edward C. Hartwig, Walnut Creek, Calif., assignors to Westinghouse Electric Corporation, East Pittsburgh, Pa., a corporation of Pennsylvania Original application July 29, 1953, Ser. No. 370,997, now Patent No. 2,785,284, dated Mar. 12, 1957. Divided and this application June 28, 1956, Ser. No. 594,410

10 Claims. (Cl. 328—71)

Our invention relates to electric discharge apparatus and has particular relation to such apparatus for controlling welding systems.

This application is a division of Patent 2,785,284, granted March 12, 1957.

In recent years, the welding art has been extended to the welding of aluminum and its alloys and like metals, such as magnesium and its alloys. These materials are to a large extent used in air frames and similar structures, and particularly for the former, it is essential that the welds be uniformly sound. It has been found that to assure soundness of the welds, each weld must be subjected to a forging operation. The forging is effected by increasing the pressure applied between the electrodes and the material being welded at a predetermined instant after the welding current is initiated and preferably while it is still flowing, above that app'ied during the squeeze interval before the welding current flows. The instant in the weld interval when the additional or forge pressure is applied is critically governed by the composition and properties of the material being welded and the conditions under which the welding takes place, for example, when a current is initiated, or on the magnitude of the welding current. High precision in the timing of the application of the forge pressure is therefore esesntial.

It has been the practice to apply the forge pressure by opening a valve between a source of fluid pressure and the cylinder within which the piston that applies the pressure moves. In accordance with the teachings or the prior art of which we are aware, the precision demanded in the forging operation may at least to a limited eqtent be achieved by controlling this valve from a solenoid which is actuable by direct current. To achieve any reasonable accuracy and reliability with apparatus including a direct current solenoid, it is essential that the solenoid valve be capab'e of responding in a very short time interval to the current supplied to the solenoid, and it has been found that the required fast-action, direct-current solenoid valve and its associated equipment is highly costly.

It is accordingly broadly an object of our invention to provide welding apparatus including highly accurate and highly reliable means for applying forge pressure to the work or material being welded.

Another object of our invention is to provide low-cost facilities for use in welding apparatus for applying forge pressure to the work with the accuracy and reliability demanded in the making of uniformly sound welds.

An incidental object of our invention is to provide welding apparatus including facilities for applying forge pressure in the operation of which it shall be possible to apply the forge pressure at any time during the interval during which current flows.

Another specific object of our invention is to provide we!ding apparatus including means for applying forge pressure when the welding current is first initiated or at any time during the interval during which the welding current flows.

An incidental object of our invention is to provide a novel electronic circuit which is particularly suitable for achieving the above stated objects and in addition has other uses.

A further incidental object of our invention is to provide a novel solenoid control circuit which is particularly suitable for achieving the above stated objects and in addition has other uses.

A further incidental object of our invention is to provide welding apparatus which is adapted to be energized from a polyphase source and which includes highly precise but low-cost facilities for applying forge pressure.

In accordance with our invention, we provide welding apparatus in which the forge pressure is applied by actuation of an ordinary alternating current solenoid valve rather than the high cost, fast-action, direct current solenoid valve. The solenoid of the alternating current valve is supplied from a forge control unit controlled by a timer circuit which permits current to be conducted through the solenoid during a se!ected time interval. The circuit also includes means for determining the phase angle in the half periods of the alternating current at which the supply of current to the solenoid is initiated after the timer circuit times out. This means in effect constitutes a vernier adjustment for the initiation of the forge pressure.

The timing of the timer circuit is controlled from a sequence timer of the usual structure including means, usually a weld timer circuit including a thyratron, for initiating and timing flow of welding current. Such a sequence timer also inc!udes means for initiating the timing of the weld time circuit, and the latter means is actuated a predetermined time interval before the weld time circuit. In accordance with our invention, the timing of the operation of the forge control unit is initiated by the means which initiates the timing of the weld time circuit. Thus, the timing of the forge control unit is initiated before the weld timing circuit acts to start the welding current, and the forge pressure may be applied at any time during the welding interval from the instant when the welding current starts to flow to the instant when the welding current stops, or even after this instant.

Figure 2:
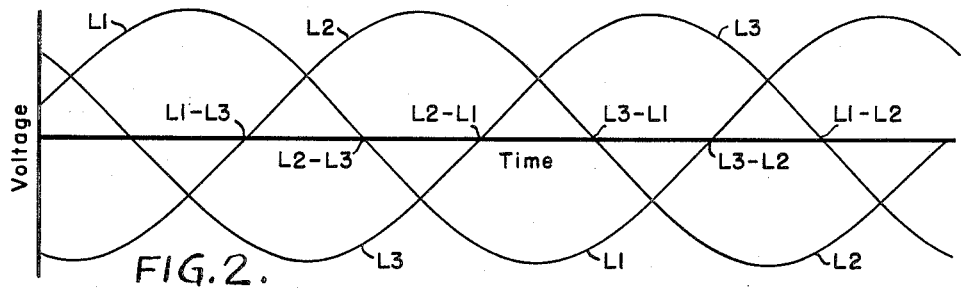
Figure 1B:
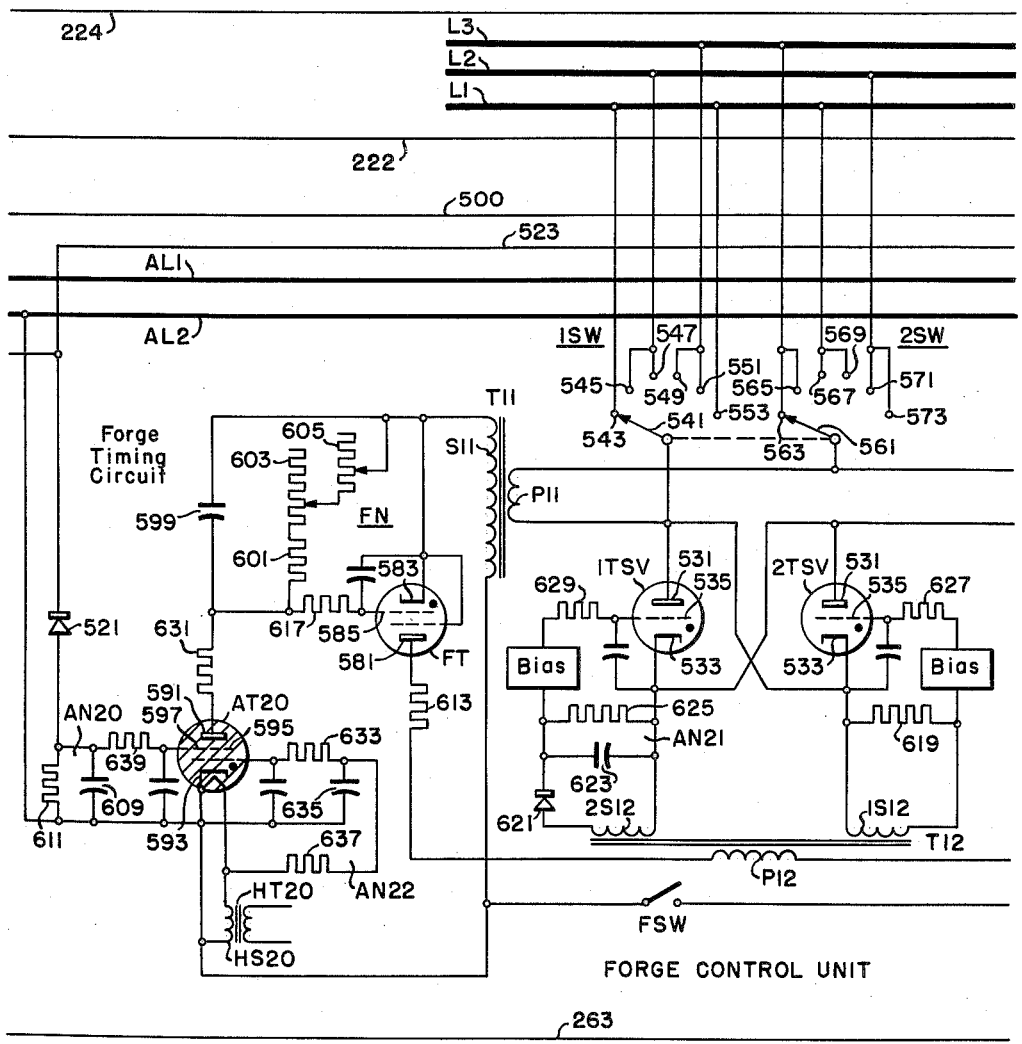
Figure 1C:
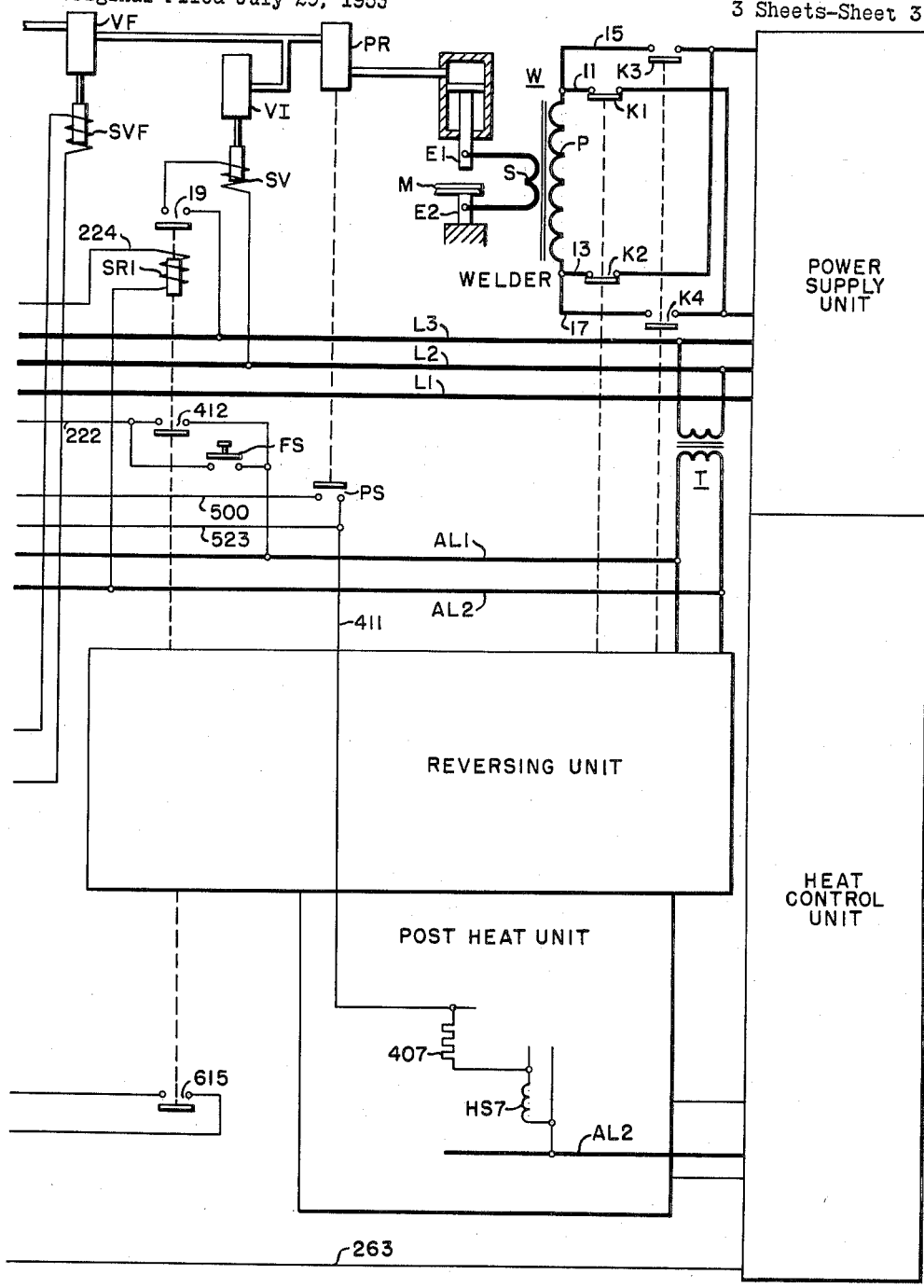

The novel features that we consider characteristic of our invention are discussed generally above. The invention itself, both as to its organization and its method of operation, together with additional objects and advantages thereof, will be understood from the following description of a specific embodiment when read in connection with the accompanying drawings, in which:

Figs. 1A, 1B and 1C together constitute a circuit diagram of a preferred embodiment of our invention; and Fig. 2 is a graph illustrating an important feature of our invention.

Description

While our invention is applicable to welders of all types, those adapted to be supplied from single-phase supplies, as well as those adapted to be supplied from polyphase supplies, it is shown herein as incorporated in a welding system of the polyphase low frequency type, such as is disclosed in an application Serial No. 272,818, filed February 21, 1952, to Clarence B. Stadum, Hubert W. Van Ness and Edward C. Hartwig, which we will call hereinafter the Stadum application. The parts of the apparatus disclosed in the Stadum application, which do not concern our invention, are not shown in detail herein, and reference is made to the Stadum application for the detailed description of these parts. So that the relationship to the Stadum application may be clear, the labelling is to the extent practicable, the same as in the Stadum application.

The apparatus shown in the drawings includes a Welder, a Power Supply Unit, a Heat Control Unit, a Post-Heat Unit, a Reversing Unit, a Sequence Timer and a Forge Control Unit. Our invention resides in the Forge Control Unit and in its cooperative relationship with the Welder and the Sequence Timer, and only the Forge Control Unit, the Welder and the Sequence Timer are shown in detail.

The apparatus disclosed herein derives its power from the main supply conductors L1, L2, and L3 of a three-phase power supply. The Sequence Timer and certain of the other components are supplied from auxiliary supply conductors AL1 and AL2, which derive their power from the conductors L2 and L3 through a transformer T.

The Welder includes a welding transformer W having a primary P and a secondary S. As is explained in the Stadum application, the primary P is adapted to be connected to, and supplied from, the Power Supply Unit, either through the contacts K1 and K2, or the contacts K3 and K4, depending on the setting of the Reversing Unit.

The welding electrodes E1 and E2 are connected across the secondary S. The electrode E2 is fixed, and the electrode E1 is movable by a piston which is hydraulically actuable. The fluid for actuating the piston is derived from a fluid supply controlled from initial pressure valve VI and forge pressure valve VF. The initial pressure valve VI is actuable by a solenoid SV adapted to be connected between the conductors L2 and L3 through the contact 19 of a starting relay SR1. The forge valve is adapted to be actuated by a solenoid SVF which is supplied from the Forge Control Unit. Solenoids SV and SVF are of the usual low cost alternating current type.

The Welder also includes a pressure switch PS which is actuated by a piston (not shown) in a cylinder PR which is interposed in the fluid supply system.

The Sequence Timer is of the type disclosed in the Stadum application and includes a squeeze thyratron ST, a weld thyratron WT, a hold thyratron HT and an off thyratron OT and associated networks including a squeeze network SN, a weld network WN, a hold network HN and an off network ON. In addition, the Sequence Timer includes the auxiliary thyratrons AT2, AT3, AT4, AT5 and AT6, the double diode D2 and the auxiliary networks AN2, AN3, AN4, and AN5.

The squeeze thyratron ST includes an anode 219, a cathode 221 and a control electrode 231. The anode 219 and the cathode 221 are connected in a circuit extending from conductor AL2 through the coil of relay SR1, the conductor 224, the anode 219, the cathode 221, conductor 222, the starting switch FS, when it is closed, or the contact 412 of the relay SR1, when it is closed, to the conductor AL1. The off network ON includes a capacitor 225 shunted by a fixed resistor 229 and a variable resistor 227. This network is connected between the control electrode 231 and the cathode 221 of the thyratron ST through a grid resistor 235.

The weld thyratron includes an anode 259, a cathode 260, a first control electrode 359 and a second control electrode 340. The anode 259 and cathode 260 of the weld thyratron WT are connected in a circuit extending from conductor AL2 in the Heat Control Unit through certain impedances in this Unit which do not concern the present invention, conductor 263, anode 259, cathode 260, to conductor AL1. The network AN4 includes a capacitor 355 shunted by a resistor 357 and the secondary winding HSW of the cathode heater transformer HTW for the weld thyratron WT. This network AN4 is connected through a grid resistor 364 between the control electrode 359 and the cathode 260 of the weld thyratron WT. Another network AN5 includes a capacitor 366 and a resistor 368, and it is connected between the other control electrode 340 and the cathode 260 through a grid resistor 372.

The hold thyratron HT includes an anode 376, a cathode 273 and a control electrode 271. The anode 376 and the cathode 273 are connected in a circuit extending from conductor AL1 through the network AN5, anode resistor 374, anode 376, cathode 273 to conductor AL2. The weld network WN includes a capacitor 265 shunted by a fixed resistor 501 and variable resistors 267 and 269. This network is connected between the control electrode 271 and the cathode 273 of the hold thyratron HT through a grid resistor 281.

The off thyratron OT includes an anode 237, a cathode 239 and a control electrode 287. The anode 237 and cathode 239 of the off thyratron are connected in a circuit extending from conductor AL1 through the starting switch FS, or the contact 412, the conductor 222, the off network ON, conductor 241, the anode resistor 242, the anode 237, the cathode 239, to the conductor AL2. The hold network HN includes a capacitor 283 shunted by the fixed resistor 285 and a variable resistor 286. This network is connected between the control electrode 287 and the cathode 239 of the off thyratron OT through a grid resistor 299.

The auxiliary thyratron AT2 includes an anode 317, a cathode 319 and a control electrode 321. The network AN2 includes a capacitor 307 shunted by a resistor 309. The network AN2 and the thyratron AT2 are connected in a circuit extending from the conductor AL2 through the network AN2, the anode resistor 315, the anode 317, the cathode 319, the conductor 222, the starting switch FS or the contact 412 to the conductor AL1. The off network ON is connected between the control electrode 321 and the cathode 319 of the thyratron AT2 through the grid resistor 325.

The thyratron AT3 has an anode 355, a cathode 305 and a control electrode 311. The squeeze network SN has a capacitor 243 shunted by a fixed resistor 247 and a variable resistor 245. The thyratron AT3 and the squeeze network SN are connected in a circuit extending from the conductor AL1 through the network SN, the anode resistor 333, the anode 355, the cathode 305 to the conductor AL2. The network AN2 is connected between the control electrode 311 and the cathode 305 through a grid resistor 313.

The thyratron AT4 has an anode 341, a cathode 339 and a control electrode 337. The network AN3 includes a capacitor 343 shunted by a resistor 345 and the secondary HS3 of the heater transformer HT3 for the cathode 305 of thyratron AT3. This thyratron is connected in several branch circuits. One of these extends from the conductor AL2 in the Post-Heat Unit through the secondary HS7 of the heater transformer HT7, a resistor 407, conductor 411, pressure switch PS when it is closed, conductor 500, the anode resistor 340, the anode 341, and the cathode 339 to the conductor AL1. Another circuit extends from the conductor AL2 through a time constant network AN20 in the Forge Control Unit, a rectifier 521, a conductor 523, the pressure switch PS, the conductor 500, the resistor 340, the anode 341 and the cathode 339 to the conductor AL1. A third circuit extends from the conductor AL2 through the network AN3, the conductor 523, the pressure switch PS, the conductor 500, the anode resistor 340, the anode 341, the cathode 339 to the conductor AL1. The control electrode 337 of the thyratron AT4 is connected to its cathode 339 through grid resistor 257 and the squeeze network SN.

The thyratron AT5 has an anode 353, a cathode 347, and a control electrode 351. The double diode D2 has a common cathode 354 and anodes 362 and 352. The anode and cathode of the thyratron AT5 are connected in a circuit extending from the conductor AL1 through the network AN4, the diode section 362—354, the anode resistor 356, the anode 353, the cathode 347 to the conductor AL2. The thyratron AT5 is also connected in a circuit supplied from the secondary S1 of the transformer T1. This circuit extends from one terminal of the secondary through the section 352—354 of the double diode D2, the current limiting resistor 356, the anode 353, the cathode 347, the weld network WN to the other terminal of the secondary S1. The network AN3 is connected between the control electrode 351 and the cathode 347 through a grid resistor 349.

The thyratron AT6 has an anode 371, a cathode 367, a first control electrode 365 and a second control electrode 428. The anode and cathode of this thyratron are connected in a circuit extending from the conductor AL2 through the hold network HN, the anode resistor 369, the anode 371, the cathode 367 to the conductor AL1. The first control electrode 365 is connected to the cathode 367 through a grid resistor 363 and through the network AN5. The second control electrode 428 is connected to the cathode directly through the repeat contact 503 of the repeat non-repeat switch RNR in the repeat position of the switch. The same control electrode is adapted to be connected through the other contact 505 of the switch RNR and through the grid resistor 430 to the off network ON in the non-repeat position of the switch.

The Forge Control Unit includes a pair of thyratrons 1TSV and 2TSV. Each thyratron has an anode 531, a cathode 533 and a control electrode 535. The anodes of the circuits of the thyratrons are supplied from the conductors L1, L2 and L3 through a pair of selector switches 1SW and 2SW. Each of the switches has a movable contact 541 and 561 which are movable together and a plurality of fixed contacts 543, 545, 547, 549, 551, 553 and 563, 565, 567, 569, 571, 573 arranged so that they may be engaged in succession as a movable contact (541 or 561) is moved over its path. The first contact 543 and the last contact 553 of switch 1SW are connected to the conductor L1; the second and third contacts 545 and 547 are connected to the conductor L2, and the fourth and fifth contacts 549 and 551 are connected to the conductor L3. The first and second contacts 563 and 565 of the switch 2SW are connected to the conductor L3, the third and fourth contacts 567 and 569 are connected to the conductor L1, and the fifth and sixth contacts 571 and 573 are connected to the conductor L2. Thus, as the movable contacts of the switches 1SW and 2SW move together over the fixed contacts the following conductors are connected in succession between the terminals of the movable contacts: L1—L3, L2—L3, L2—L1, L3—L1, L3—L2, L1—L2.

The conductors L1, L2 and L3 are usually connected each to the three buses of a three-wire, three-phase system. Under such circumstances, the potentials which appear across the movable contacts 541 and 561 of the switches 1SW, 2SW, as these contacts are set on successive sets of fixed contacts, are displaced in phase by 60°. This may be understood by consideration of Fig. 2 in which voltage is plotted vertically and time horizontally. The sine curves of Fig. 2 which are labeled L1, L2 and L3, represent the potentials on the conductors L1, L2 and L3 with reference to an artificial neutral. The potential which appears between the movable contacts 541 and 561 of the switches 1SW and 2SW for any setting of these contacts is equal to the difference between the potentials of the buses to which these contacts are connected. Thus, with the switches set in the first position, the potential between the movable contacts 541 and 561 would be represented by a curve corresponding to the difference between the ordinates of the curves L1 and L3. Such a curve would be a sine wave, and its phase position could be determined by observing where the curve passes through zero, that is where the ordinates of the curves L1 and L3 are equal and opposite; and that is at the point labeled L1—L3. In the second position of the switches, the curves L2 and L3 are to be considered. In this case, the curve representing the actual potential differences passes through zero at the point labeled L2—L3 which is displaced by 60° from the point labeled L1—L3. Similarly, for the other positions of these switches, the curves representing the potentials between the movable contacts of the switch pass through zero at the points labeled L2—L1, L3—L1, L3—L2, and L1—L2. It is seen that these points are progressively displaced in phase by 60° or ⅙ of a period, and thus as the movable contacts 541 and 561 move from one position to the other, the potential derivable at these contacts is advanced by 60°.

The anodes 531 and cathodes 533 of the thyratrons 1TSV and 2TSV are connected in antiparallel between the movable contacts 541 and 561 of the switches 1SW and 2SW through the solenoid SVF of the forge pressure valve VF. This solenoid being of the alternating current type may be energized by current flowing through the thyratrons 1TSV and 2TSV. The thyratrons 1TSV and 2TSV are controlled from the forge timing circuit. This circuit includes the forge thyratron FT and the auxiliary thyratron AT20, and the network AN20 and the network FN. The forge thyratron FT, has an anode 581, a cathode 583 and a control electrode 585. The thyratron AT20 has an anode 591, a cathode 593, a first control electrode 595 and a second control electrode 597. The network FN includes a capacitor 599 shunted by a fixed resistor 601 and a plurality of variable resistors 603 and 605 which may be set to determine the rate of which the capacitor 599 discharges when it is charged.

The network AN20 includes a capacitor 609 shunted by a resistor 611. The anode-cathode circuit of the thyratron FT is supplied with potential derived from the movable contacts 541 and 561 of the switches 1SW and 2SW through the transformer T11. The primary P11 of this transformer is connected across the movable contacts 541 and 561. The secondary S11 of the transformer is connected between the anode 581 and cathode 583 of the thyratron FT through an anode resistor 613, the primary P12 of a control transformer T12, a contact 615 of the starting relay SR1, and a switch FSW which is closed to set the apparatus for forge. The network FN is connected between the control electrode and the cathode of the thyratron FT through a grid resistor 617.

The control transformer T12 has two secondaries 1S12 and 2S12. The first secondary 1S12 is connected across a resistor 619; the other secondary 2S12 is connected through a rectifier 621 across a network AN21 consisting of a capacitor 623 shunted by a resistor 625. The first resistor 619 is connected between the control electrode 535 and the cathode 533 of the thyratron 2TSV through a bias and a grid resistor 627. The network AN21 is connected between the control electrode 535 and the cathode 533 of the thyratron 1TSV through a bias and another grid resistor 629. The bias is in each case adequate to maintain the thyratrons 1TSV and 2TSV, respectively, non-conducting in the quiescent and condition of the apparatus. The potential which appears across the secondaries 1S12 and 2S12 when the primary P12 conducts, is adequate to counteract the bias in each case.

Thyratron FT conducts only during half periods of the potential impressed by the secondary S11. The secondaries 1S12 and 2S12 are so poled that the potential induced in the secondary 1S12 counteracts the bias in the control circuit of thyratron 2TSV during the half period when the anode of this thyratron is positive relative to the cathode. Thyratron 2TSV then conducts simultaneously with thyratron FT. During this same half period, the left-hand terminal of secondary 2S12 is positive relative to the right-hand terminal, and the capacitor 623 of network AN21 is charged so that the control electrode 535 of thyratron 1TSV is positive relative to the cathode 533. But, during this half period, the anode 531 of thyratron 1TSV is negative relative to the cathode 533. During the succeeding half period when the anode of thyratron 1TSV is positive relative to the cathode, the capacitor 623 of the network AN21 still has an adequate charge to permit thyratron 1TSV to conduct in spite of the fact that thyratron FT is during this half period non-conducting. Thus, for each half period during which thyratron FT conducts, thyratrons 1TSV and 2TSV conduct a full period.

Thyratron AT20 is also supplied from the secondary S11 but is connected in opposite phase to the thyratron FT. Thus, the anode-cathode circuit of the thyratron AT20 extends from the upper terminal of secondary S11 through network FN, an anode resistor 631, the anode 591 and cathode 593 of the thyratron AT20 to the lower terminal of secondary S11. The first control electrode 595 of thyratron AT20 is connected to the cathode 593 through a grid resistor 633 and a time constant network AN22 consisting of a capacitor 635 shunted by a resistor 637 and the secondary HS20 of the cathode-heater transformer HT20 for the thyratron AT20. The other control electrode 597 is connected to the cathode 593 of the thyratron AT20 through a grid resistor 639 and the network AN20. The network AN22 produces a ripple in the control circuit of the thyratron AT20 so that when this thyratron AT20 is conditioned to conduct by the discharge of the network AN20, it begins to conduct at an instant displaced by about $\frac{1}{12}$ of a period from the point of zero potential in the positive half period of the potential supplied by the secondary S11. Thus, in the stand-by condition of the apparatus, false operation of the thyratron AT20 is precluded because network AN20 charges before thyratron AT20 can conduct. The Power Supply Unit, the Heat Control Unit, the Reversing Unit and the Post-Heat Unit have the structure described in the Stadum application.

*Stand-by*

In the stand-by condition of the apparatus, the power switches or circuit breakers (not shown) for the apparatus are closed, and the conductors L1, L2, L3 and AL1 and AL2, are supplied with potential. Under such circumstances, heating current is supplied to the cathodes of all of the thyratrons, and the latter are in condition to conduct. If the welding is to include a forge operation the switch FSW is closed.

It may be assumed that the Sequence Timer is set for repeat operation, as shown in the drawing. The second control electrode 428 of the thyratron AT6 is then connected to its cathode 367, and the contact 507 across the variable resistor 227 is open.

Thyratrons ST and AT2 are non-conducting because the switch FS and the contact 412 are open. Because thyratron ST is non-conducting, relay SR1 is deenergized, contact 19 is open, solenoid SV is deenergized and VI is closed. Because thyratron AT2 is non-conducting network AN2 is discharged, and thyratron AT3 is conducting. Network SN is then charged, and thyratron AT4 is non-conducting. Because thyratron AT4 is non-conducting, several conditions exist in the system. The network AN3 is discharged, the Post-Heat Unit is not in operation, and the network AN20 is discharged.

Because the network AN3 is discharged, the thyratron AT5 is conducting, and the network AN4, and the network WN are both charged through the double diode D2 which is also conducting. Because the network AN4 is charged, the weld thyratron WT is non-conducting. The Heat Control Unit then is not energized and the Power Supply Unit is quiescent. Current then does not flow through the primary P of the welding transformer W.

Because the network WN is charged, thyratron HT is non-conducting. The network AN5 is then discharged and thyratron AT6 is conducting. The network HN is then charged and thyratron OT is non-conducting. The network ON is then uncharged and thyratrons ST and AT2 are capable of conducting during the first positive half period immediately following the closing of the switch FS.

In the Forge Control Unit, the thyratron AT20 is conducting because network AN20 is uncharged. Network FN is charged and the thyratron FT is non-conducting. The primary P12 then does not conduct current, and the thyratrons 1TSV and 2TSV are non-conducting so that the solenoid SVF is deenergized and the valve VF is closed.

*Operation*

In preparing the apparatus for a welding operation the forge network FN is set to yield the desired timing for the start of the forge interval, and a vernier adjustment is made by setting the switches 1SW and 2SW at the proper fixed contacts. The primary P11 is then supplied with potential displaced in phase by a fraction of a period corresponding to the settings of the switches 1SW and 2SW. In the situation shown in the drawings, this displacement lags the potential between the conductors L2 and L3 by 60°. The potential between the buses AL1 and AL2 is in phase with the potential between the buses L2 and L3, and thus the potential across the primary P11 lags the potential between the buses AL1 and AL2 by 60°.

To initiate a welding operation, the work M is disposed on electrode E2 and the start switch FS is closed. The thyratrons ST and AT2 are then immediately rendered conducting. The current flow through the thyratron ST energizes the relay SR1 and its contacts close. At the upper contact 19, the circuit through the solenoid SV is closed. At the contact 412, the coil of the relay SR1 is locked in independently of the start switch FS, and at the lower contact, the circuit through the forge thyratron FT is closed. When the solenoid SV is energized, the valve VI is opened, and pressure is supplied to cause electrode E1 to engage the work M. When the pressure built up between the electrodes E1 and E2 and the work M is adequate, the pressure switch PS is closed.

When the thyratron AT2 conducts, it immediately charges the network AN2 impressing a blocking potential on the thyratron AT3. The thyratron AT3 is connected in opposite phase to the thyratron AT2 and conducts during the half periods following those during which the anode-cathode potential of the thyratron AT2 is positive. In this case, the thyratron AT2 has charged the network AN2 at the beginning of the half period following the conduction of the thyratron AT2. Thyratron AT3 then fails to conduct during the half period following the conduction of thyratron AT2.

When thyratron AT3 becomes non-conducting, the network SN discharges. This network is set to discharge in a time interval adequate to permit pressure to be applied to the work and pressure switch PS to close. At the end of this time interval which is called the squeeze interval, network SN has discharged sufficiently to permit thyratron AT4 to conduct. The conduction of thyratron AT4 has several affects. First, the timing of the Post-Heat Unit is started; this does not concern the invention. In addition, the network AN3 is charged to continue the timing of the Sequence Timer. Thirdly, the network AN20 is charged. When the network AN20 is charged, the thyratron AT20 is rendered non-conducting, and the network FN starts to time out. While the network FN is timing out, the timing of the Sequence Timer continues.

Because the network AN3 is charged, thyratron AT5 is rendered non-conducting. This thyratron is supplied with potential in opposite phase to the potential of thyratron AT4 and is for the first time rendered non-conducting during its positive half period of anode-cathode potential immediately following its first negative half period during which thyratron AT4 conducts. This operation is assured because the winding HS3 introduces a ripple in the network AN3 which causes the thyratron AT5 to be fired, when it is fired, at an instant delayed by about $\frac{1}{12}$ of a period from the instant of zero anode-cathode potential. When the thyratron AT4 conducts, the network AN3 is charged at the beginning of the half period, and thyratron AT5 cannot become conducting.

When thyratron AT5 becomes non-conducting, network

AN4 discharges, permitting thyratron WT to conduct. Thyratron WT energizes the Heat Control Unit which in turn energizes the Power Supply Unit to supply current to the primary P, as is explained in the Stadum application. Welding current then flows through the material being welded.

At the same time, network FN is timing out. When this network has timed out, thyratron FT is rendered conducting, and current is supplied through the primary P12 to render thyratrons 2TSV and 1TSV conducting in succession. Current is then supplied through the solenoid SVF and the valve FV is opened to apply forge pressure to the work M. The current flow to solenoid SVF is initiated at an instant precisely corresponding to the setting of the switches 1SW and 2SW because both the anode potential for thyratron FT and the anode potentials for thyratrons 2TSV and 1TSV are supplied in synchronism with the potential corresponding to this setting. Thus, the instant of operation of the valve VF may be set precisely by setting the switches 1SW and 2SW.

Network AN4 which determines when thyratron WT conducts, is capable of timing out in an interval of the order of one period of the supply. Thyratron WT thus conducts one period after thyratron AT5 is for the first time rendered non-conducting. Thus, thyratron WT conducts approximately one and one-half periods after thyratron AT4 conducts. Since the conduction of thyratron AT4 starts the timing out of network FN, network FN starts to time out about one period and a half before thyratron WT conducts. Thus, network FN can be set to time out completely or to time out to any extent desirable before thyratron WT conducts. This feature is of importance because the timing out of network FN determines the instant when the forge pressure is applied and the conduction of thyratron WT causes the welding current to flow. The timed relationship between the operations of the thyratron AT4 and WT thus permits the forge pressure to be applied at any time before or during the interval during which welding current is flowing.

The welding operation now continues with the forge pressure applied so long as thyratron AT4 conducts. During this operation, the Post-Heat Unit times out and post-heat current is supplied.

When thyratron AT4 was rendered conducting, the charging of weld network WN was interrupted and the weld network began to time out. At an instant determined by its setting, the weld network does time out and permits the hold thyratron HT to conduct. Network AN5 is then charged, rendering the weld thyratron WT non-conducting and stopping the flow of welding current. But thyratron AT4 continues to conduct, maintaining thyratron AT20 non-conducting, thyratron FT conducting and thyratrons 1TSV and 2TSV conducting so that valve VF remains open and the pressure remains applied to the work. The work is now permitted to solidify under the pressure.

The charging of the network AN5 in addition to causing thyratron WT to stop conducting also renders thyratron AT6 non-conducting. The charging of the hold network HN is then stopped, and the hold network times out. At the end of the interval of the hold network, the off thyratron OT is rendered conducting, charging the off network ON. Thyratron ST, the squeeze thyratron, is now rendered non-conducting, and the relay SR1 is deenergized. Contact 615 in the circuit of thyratron FT and contact 19 are now opened, deenergizing the supply circuits to solenoids SV and SVF, and valves VF and V1 are opened, permitting the movable electrode E1 to be retracted from the work. With the reduction in pressure, switch PS is also opened.

While this is taking place during the off interval, the Sequence Timer is resetting itself. When the off network ON is charged, the thyratron AT2 is rendered non-conducting. The network AN2 is then discharged, and the thyratron AT3 becomes conducting. The squeeze network SN is then charged and reset for a new operation. Thyratron AT4 is then rendered non-conducting, even while pressure switch PS remains closed. Network AN3 is then discharged, permitting thyratron AT5 to conduct to reset network AN4 and the weld network WN, both being charged. Thyratron HT is then rendered non-conducting, permitting network AN5 to discharge. Thyratron AT6 then becomes conducting, resetting network HN. Thyratron OT is then rendered non-conducting, permitting network ON to discharge and be reset for a second operation.

In addition, the Forge Control Unit is reset. When thyratron AT4 becomes non-conducting, the network AN20 is discharged, permitting thyratron AT20 to conduct to charge network FN and reset it. A bias is then applied to thyratron FT so that it may be rendered conducting under the control of network FN.

The welding operation is now completed. If it is desired to produce another weld, the work M is properly reset on the electrode E2, and the switch FS is again closed or remains closed and the above-described operation is repeated.

Conclusion

It is seen that we have provided welding apparatus, including facilities for applying forge pressure precisely and reliably at any time during the interval during which the welding current is flowing. This forge pressure is applied by means of a low-cost alternating current solenoid and the instant of operation of the solenoid is precisely adjusted.

Our invention has been illustrated as applied to a welder of the type disclosed in the Stadum application. It is equally as well applicable to welders of other types, either single-phase commercial frequency or polyphase or single-phase low frequency.

While we have shown and described a certain specific embodiment of our invention, many modifications thereof are possible. Our invention therefore is not to be restricted except insofar as is necessitated by the spirit of the prior art.

We claim as our invention:

1. In combination, a plurality of conductors adapted to be connected to a polyphase supply; a selector switch means having a plurality of settings connected to said source and including a first terminal adapted to be connected to any one of said conductors and a second terminal adapted to be connected to any one of said conductors, said terminals being ganged and being connected to different conductors in any setting of said switch means; a pair of electric discharge paths each defined by an anode and a cathode; a load means and means for connecting said paths in antiparallel between said terminals and said load means.

2. In combination, a plurality of conductors adapted to be connected to a polyphase supply; a selector switch means having a plurality of settings connected to said source and including a first terminal adapted to be connected to any one of said conductors and a second terminal adapted to be connected to any one of said conductors, said terminals being ganged and being connected to different conductors in any setting of said switch means; a pair of electric discharge paths each defined by an anode and a cathode; a solenoid of the type that is actuable by alternating current and means for connecting said paths in antiparallel between said terminals and said solenoid.

3. In combination, a plurality of conductors, a first selector switch having a plurality of pole means connected each to one of said conductors and means for selecting one of said pole means, a second selector switch having a plurality of pole means connected each to one of said conductors and means for selecting one of said last-mentioned pole means, said selecting means of said first and second selector switches being ganged and in any setting of said selecting means selecting pole means connected to different conductors, a pair of electric discharge paths each defined by an anode and a cathode, and means for connecting said paths in antiparallel between said selected pole means.

4. In combination, a plurality of conductors, a first selector switch having a plurality of pole means connected each to one of said conductors and means for selecting one of said pole means, a second selector switch having a plurality of pole means connected each to one of said conductors and means for selecting one of said last-mentioned pole means, said selecting means of said first and second selector switches being ganged and in any setting of said selecting means selecting pole means connected to different conductors, a pair of electric discharge paths each defined by an anode and a cathode and including a control electrode, means for connecting said paths in antiparallel between said selected pole means, and means connected to said control electrodes for rendering said paths conducting for a predetermined time interval.

5. In combination, a plurality of conductors, a first selector switch having a plurality of pole means connected each to one of said conductors and means for selecting one of said pole means, a second selector switch having a plurality of pole means connected each to one of said conductors and means for selecting one of said last-mentioned pole means, a pair of electric discharge paths each defined by an anode and a cathode and including a control electrode, means for connecting said paths in antiparallel between said selected pole means, means connected to said control electrodes for rendering said paths conducting for a predetermined time interval, the last said means including a third electric discharge path having an anode and a cathode, and means for coupling said selected poles between said anode and cathode of said third path.

6. In combination, a plurality of conductors, a first selector switch having a plurality of pole means connected each to one of said conductors and means for selecting one of said pole means, a second selector switch having a plurality of pole means connected each to one of said conductors and means for selecting one of said last-mentioned pole means, a pair of electric discharge paths each defined by an anode and a cathode and including a control electrode, means for connecting said paths in antiparallel between said selected pole means, and means connected to said control electrodes for rendering said paths conducting for a predetermined time interval, the last said means including a third electric discharge path having an anode and a cathode, a first transformer having a primary and a secondary, means for connecting said primary to said selected poles, a second transformer having a primary and a plurality of secondaries; means for connecting one of said last-named secondaries each between the control electrode and the cathode of one of said pair of discharge paths, and means for connecting in series said anode and cathode of said third path, said secondary of said first transformer and said primary of said second transformer.

7. In combination, a plurality of conductors, a first selector switch having a plurality of pole means connected each to one of said conductors and means for selecting one of said pole means, a second selector switch having a plurality of pole means connected each to one of said conductors and means for selecting one of said last-mentioned pole means, a pair of electric discharge paths each defined by an anode and a cathode and including a control electrode, means for connecting said paths in antiparallel between said selected pole means, and means connected to said control electrodes for rendering said paths conducting for a predetermined time interval, the last said means including a third electric discharge path having an anode and a cathode, a first transformer having a primary and a secondary, means for connecting said primary to said selected poles, a second transformer having a primary and a plurality of secondaries, means for connecting one of said last-named secondaries each between the control electrode and the cathode of one of said pair of discharge paths, the connection between one of said secondaries of said second transformer and the control electrode and cathode of the associated discharge path including time delay means and means for connecting in series said anode and cathode of said third path, said secondary of said first transformer and said primary of said second transformer.

8. In combination, a plurality of conductors, a first selector switch having a plurality of pole means connected each to one of said conductors and means for selecting one of said pole means, a second selector switch having a plurality of pole means connected each to one of said conductors and means for selecting one of said last-mentioned pole means, a pair of electric discharge paths each defined by an anode and a cathode and including a control electrode, means for connecting said paths in antiparallel between said selected pole means, means connected to said control electrodes for rendering said paths conducting for a predetermined time interval, the last said means including a third electric discharge path having an anode and a cathode, and a control electrode, a time constant network connected between said last-named control electrode and cathode, said network when charged preventing conduction of said third device and when discharged permitting conduction of said third device, and means for coupling said selected poles between said anode and cathode of said third path.

9. In combination, first switch means having $2n$ poles identifiable as first, second, third and so on to $2n$th pole and having a movable contact movable in succession from engagement with the first of said poles to engagement with the $2n$th of said poles; the said movable contact engaging only one of said poles in each setting; second switch means having $2n$ poles also identifiable as first, second, third and so on to $2n$th pole and having a movable contact movable in succession from engagement with a first of said last-named poles to engagement with the $2n$th of said last-named poles; the said movable contact engaging only one of said last-named poles in each setting; means ganging said movable contacts; means connecting together the second and third, third and fourth and so on up to the $(2n-2)$nd and the $(2n-1)$st poles of said first switch means; means connecting together the first and second; the second and third and so on up to the $(2n-1)$th and the $2n$th poles of said second switch means; a pair of electric discharge paths each having an anode and a cathode; and means connecting said anode and cathodes in antiparallel between said movable contacts.

10. Apparatus for supplying power from an $n$ phase supply having $n$ buses identifiable as first, second, third and so on to the $n$th bus comprising in combination first switch means having $2n$ poles identifiable as first, second, third and so on to $2n$th pole and having a movable contact movable in succession from engagement with the first of said poles to engagement with the $2n$th of said poles; said movable contact engaging only one of said poles in each setting; second switch means having $2n$ poles also identifiable as first, second, third and so on to $2n$th pole and having a movable contact movable in succession from engagement with a first of said last-named poles to engagement with the $2n$th of said last-named poles; said movable contact engaging only one of said last-named poles in each setting; means ganging said movable contacts; means connecting together the second and third, third and fourth and so on up to the $(2n-2)$nd and the $(2n-1)$st poles of said first switch means; means for connecting the first of the last-named poles to the first bus, the second and third to the second bus and so on to the $(2n-2)$nd and the $(2n-1)$st to $(n-1)$st bus and the $2n$th to the $n$th bus; means connecting together the first and second, the second and third and so on up to the $(2n-1)$th and the $2n$th poles of said second switch means; means for connecting the first and second of the last-named poles to the $n$th bus, the third and fourth to the first bus, the fourth and fifth to the second bus and so on to the $(2n-1)$st and the $2n$th to the $(n-1)$st bus; load means, and means for connecting said load means between said movable contacts.

References Cited in the file of this patent

UNITED STATES PATENTS

| | | |
|---|---|---|
| 2,201,595 | Szabo | May 21, 1941 |
| 2,253,165 | Beymer | Aug. 19, 1941 |
| 2,394,087 | Mahoney | Feb. 5, 1946 |
| 2,398,771 | Compton | Apr. 23, 1946 |
| 2,467,747 | Hibbard et al. | Apr. 19, 1949 |
| 2,656,461 | Elliott | Oct. 20, 1953 |
| 2,765,402 | Bivens | Oct. 2, 1956 |
| 2,774,934 | Gitzendanner | Dec. 18, 1956 |
| 2,808,547 | Adler et al. | Oct. 1, 1957 |

FOREIGN PATENTS

| | | |
|---|---|---|
| 621,466 | Great Britain | Apr. 11, 1949 |